(12) United States Patent
Gilmutdinov et al.

(10) Patent No.: US 9,183,640 B2
(45) Date of Patent: Nov. 10, 2015

(54) METHOD OF AND APPARATUS FOR LOW-COMPLEXITY DETECTION OF PERIODIC TEXTURES ORIENTATION

(75) Inventors: Marat Ravilevich Gilmutdinov, Saint-Petersburg (RU); Anton Igorevich Veselvo, Saint-Petersburg (RU); Ivan Nikolaevich Grokhotkov, Gatchina (RU)

(73) Assignee: INTEL CORPORATION, Santa Clara, CA (US)

( * ) Notice: Subject to any disclaimer, the term of this patent is extended or adjusted under 35 U.S.C. 154(b) by 97 days.

(21) Appl. No.: 13/997,549

(22) PCT Filed: Dec. 29, 2011

(86) PCT No.: PCT/RU2011/001051
§ 371 (c)(1),
(2), (4) Date: Jun. 24, 2013

(87) PCT Pub. No.: WO2013/100785
PCT Pub. Date: Jul. 4, 2013

(65) Prior Publication Data
US 2013/0272616 A1 Oct. 17, 2013

(51) Int. Cl.
G06K 9/36 (2006.01)
G06T 7/20 (2006.01)
G06T 7/00 (2006.01)
G06T 7/40 (2006.01)

(52) U.S. Cl.
CPC .............. *G06T 7/206* (2013.01); *G06T 7/0044* (2013.01); *G06T 7/402* (2013.01); *G06T 2207/20056* (2013.01)

(58) Field of Classification Search
USPC ................ 382/216, 217, 220, 277, 280, 282; 358/520, 537, 538
See application file for complete search history.

(56) References Cited

U.S. PATENT DOCUMENTS

| | | | | |
|---|---|---|---|---|
| 5,748,904 A * | 5/1998 | Huang et al. | | 345/544 |
| 6,697,501 B2 * | 2/2004 | Tevs et al. | | 382/107 |
| 7,292,333 B2 * | 11/2007 | Fontaine et al. | | 356/300 |
| 7,415,135 B2 * | 8/2008 | Tevs et al. | | 382/106 |
| 7,505,609 B1 * | 3/2009 | Hartman et al. | | 382/103 |
| 7,656,529 B1 * | 2/2010 | Nikoonahad | | 356/401 |
| 8,018,371 B1 * | 9/2011 | Paschen et al. | | 342/90 |
| 8,300,674 B2 * | 10/2012 | Guey | | 375/136 |

(Continued)

OTHER PUBLICATIONS

"PCT Notification of Transmittal of the International Search Report and the Written Opinion of the International Searching Authority, or the Declaration", dated Sep. 26, 2012, for International Application No. PCT/RU2011/001051, 11pgs.

(Continued)

*Primary Examiner* — Yosef Kassa
(74) *Attorney, Agent, or Firm* — Buckley, Maschoff & Talwalkar LLC

(57) ABSTRACT

A method includes calculating a Fourier transform of an image, extracting a plurality of arrays, from the Fourier transform utilizing, for each of the plurality of arrays, one of a plurality of templates each of said templates corresponding to a texture orientation, calculating a maximum value for each of the plurality of arrays, identifying each of the plurality of arrays having a calculated maximum value greater than a predetermined threshold and determining, for each of the plurality of identified arrays, the texture orientation of the template utilized to extract the identified one of the plurality of arrays.

27 Claims, 7 Drawing Sheets

(56) References Cited

U.S. PATENT DOCUMENTS

2008/0144899 A1* 6/2008 Varma et al. .................. 382/129
2010/0067826 A1 3/2010 Honsinger et al.

OTHER PUBLICATIONS

K. Carneiro et al., "Roughness Parameters of Surfaces by Atomic Force Microscopy", Annals of CIRP, vol. 44, No. 1, Jan. 1, 1995, XP022137099, ISSN: 0007-8506, DOI: 10.1016/S0007-8506(07)62376-2, (pp. 517-522, 6 total pages).

Hieu Nguyen et al., "Directional Filtering for Quantification of Collagen Alignment in Normal Ligaments", Twelfth Annual Northeast Bioengineering Conference Mar. 13-14, 1986, XP009162831, 1986, (pp. 141-144, 4 total pages).

Joan S. Weszka et al., "A Comparative Study of Texture Measures for Terrain Classification", IEEE Transactions on Systems, Man and Cybernectics, IEEE Inc. New York, US, vol. SMC-5, No. 4, Apr. 1, 1976, XP011289129, ISSN: 0018-9472, (pp. 269-285, 17 total pages).

Naeem Qaiser et al., "Optimum Window-size Computation for Moment Based Texture Segmentation", Multi Topic Conference, 2003, 7th International Islamabad, Pakistan Dec. 8-9 2003, Piscataway, NJ, USA, IEEE, Dec. 8, 2003, XP010782404, ISBN: 978-0-7803-8183-4, (pp. 25-31, 7 total pages).

Antonio B. Torralba et al., "Semantic Organization of Scenes using Discriminant Structural Templates", Computer Vision, 1999, The Proceedings of the Seventh IEEE International Conference on Kerkyra, Greece Sep. 20-27, 1999, Los Alamitos, CA, USA, IEEE Comput. Soc. US, vol. 2, Sep. 20, 1999, XP010350523, ISBN: 978-0-7695-0164-2, (pp. 1253-1258, 6 total pages).

* cited by examiner

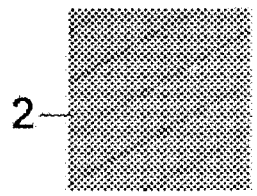
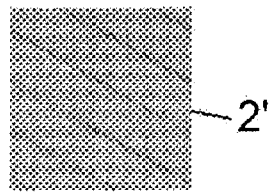
FIG.1A   FIG.1B
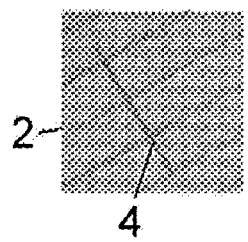
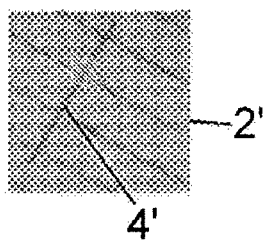
FIG.2A   FIG.2B
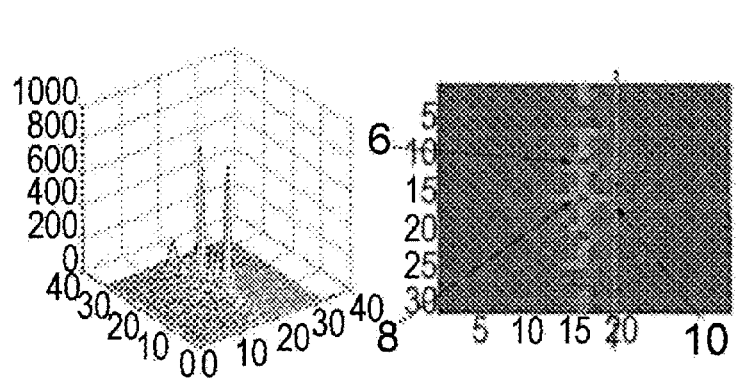
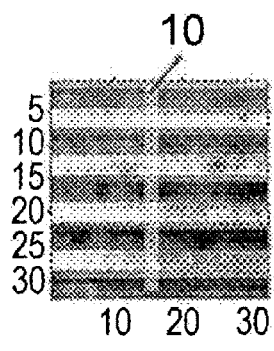
FIG.3A   FIG.3B   FIG.3C

METHOD OF AND APPARATUS FOR LOW-COMPLEXITY DETECTION OF PERIODIC TEXTURES ORIENTATION

BACKGROUND OF THE INVENTION

The performance of accurate texture detection and analysis is an important task when performing image analysis. Specifically, texture detection and analysis is utilized when detecting motion for use in frame interpolation for frame rate up-conversion, video surveillance, and the like. The performance of such analysis in real or near real time when dealing with video can require substantial computational resources.

There may therefore exist a need to provide a low-complexity solution to identifying texture orientations, particularly those which repeat with an identifiable periodicity.

BRIEF DESCRIPTION OF THE DRAWINGS

An understanding of embodiments described herein and many of the attendant advantages thereof may be readily obtained by reference to the following detailed description when considered with the accompanying drawings, wherein:

FIGS. 1A-1B are illustrations of exemplary regular textures;

FIGS. 2A-2B are illustrations of the exemplary regular textures of FIGS. 1A-1B showing corresponding texture orientations;

FIG. 3A is a perspective rendering of a Fourier transform according to an exemplary and non-limiting embodiment;

FIG. 3B is a gray scale rendering of a Fourier transform illustrating various components of the Fourier transform according to an exemplary and non-limiting embodiment;

FIG. 3C is an illustration of a regular texture and a corresponding texture orientation according to an exemplary and non-limiting embodiment;

DETAILED DESCRIPTION OF EXAMPLE EMBODIMENTS

Figure 4:
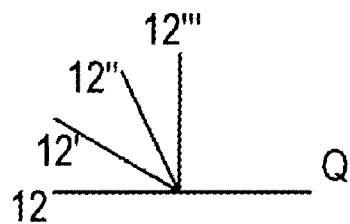
FIG. 4 is an illustration of a plurality of orientation angles according to an exemplary and non-limiting embodiment.

In accordance with various exemplary embodiments described herein, there is provided a method for determining the orientation of periodic textures in images. There is additionally described a low-complexity solution for implementing the aforementioned method of texture orientation determination.

An image may contain periodic patterns where the color or intensity and shape of one or more texture elements are repeated at approximately equal intervals. With reference to FIGS. 1A-1B there are illustrated two exemplary images 2, 2' showing a repeating pattern comprising, generally, a plurality of linear darkened lines repeating at approximately even intervals and oriented in approximate parallel fashion one to the other. As used herein, a "regular texture" refers to an image, perhaps forming a part of a larger image, that is comprised of at least one repeating or periodic pattern having different orientations.

With reference to FIGS. 2A-2B, there are illustrated the orientation vectors 4, 4' corresponding to the textures illustrated in FIGS. 1A-1B. Each orientation vector 4, 4' is a vector wherein the texture is repeated along the direction of the orientation vector 4, 4'.

In accordance with exemplary and non-limiting embodiments, an algorithm for texture orientation detection is based, at least in part, on the following two properties of regular (periodic) textures. First, a Fourier transform of regular textures contain one or more peaks. These peaks represent locations where the energy of the Fourier transform is concentrated. Second, the location of these peaks determines two features of a regular texture, specifically, the orientation and the period of the regular texture.

In accordance with an exemplary and non-limiting embodiment, texture orientation may be derived from each peak location using the following rule: the texture orientation, and hence the direction component of a corresponding orientation vector 4, is parallel to line drawn through the origin point (0, 0), corresponding to the DC coefficient of the Fourier transform, and the point corresponding to the coordinates of the peak.

With reference to FIG. 3A, there is illustrated a perspective rendering of a Fourier transform of a regular texture. With reference to FIG. 3B, there is illustrated a gray scale rendering of the Fourier transform of FIG. 3A wherein there is labeled a peak 6, the DC coefficient 8 and the resultant derived orientation 10. Note that a line drawn through the origin and perpendicular to the orientation operates as an axis of symmetry between pairs of related peaks. As a result, two orientation vectors 4 each starting at the origin and extending to each of a pair of related peaks would have a difference in direction of approximately 180 degrees. This results from the attribute that a regular texture may repeat in one of two directions effectively forwards or backwards along an orientation vector 4. Lastly, FIG. 3C illustrates orientation 10 superimposed upon the regular texture from which orientation 10 was derived. Note that, as used herein, "orientation 10" is a line parallel to an orientation vector 4 and, as such, may be used interchangeably with "orientation vector 4" where appropriate.

In accordance with an exemplary and non-limiting embodiment, a series of templates 12 are computed and stored wherein each template represents a unique and quantized orientation. Each template may be represented by an array, $T_{kij}$ where k is the number of templates and i and j are the horizontal and vertical array dimensions of the Fourier transform. With reference to FIG. 4, there is illustrated a plurality of exemplary orientation angles 12. In the present example, each orientation angle 12 differs from its closest neighbors by approximately thirty-three (33) degrees. In practice, any desired degree of resolution between orientation angles 12 may be realized by increasing the number of templates, Q, each corresponding to a unique orientation angle 12 as illustrated in FIG. 4.

Figure 5:
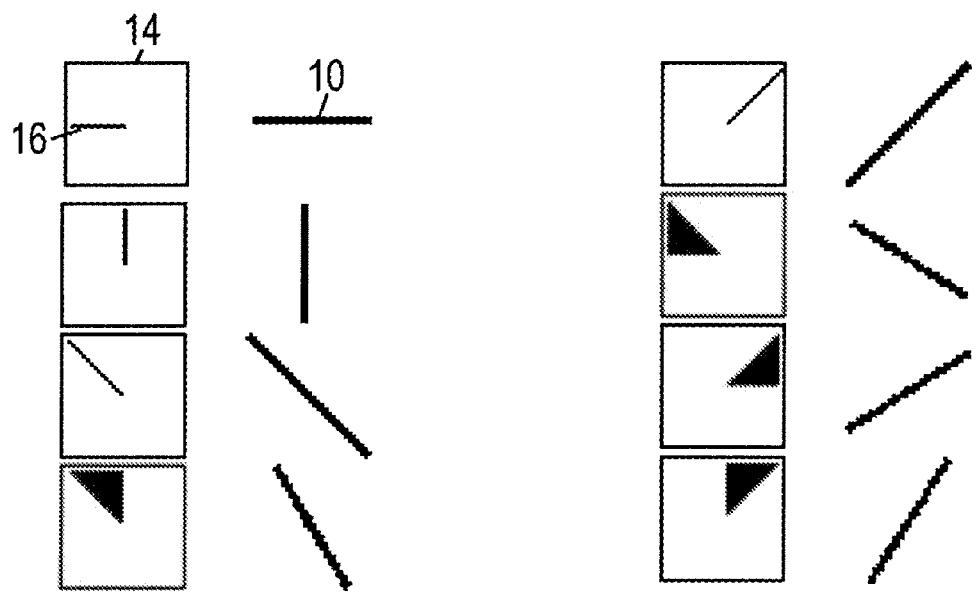
FIG. 5 is an illustration of a plurality of templates and corresponding texture orientations according to an exemplary and non-limiting embodiment.

With reference to FIG. 5, there is illustrated a plurality of templates 14 and the orientation 10 having an orientation angle 12 associated therewith where Q=8. As illustrated, each template is an array of values having dimensions corresponding to those of a Fourier transform with a line 16 extending from the center of the template 14 to a periphery of template 14 at an angle corresponding to an orientation angle 12. In an exemplary embodiment, the values of each array element of each template 12 located in close proximity to line 16 have a value of one (1) with every other array element having a value of zero (0). As is evident, line 16 is parallel to the orientation 10 corresponding to each template 14. As a result, as used herein, a template 14, Tk (k=1, 2, . . . Q), may be referred to as possessing a corresponding orientation 10 where the corresponding orientation 10 is parallel to a unique one of the k orientation angles 12.

Figure 6:
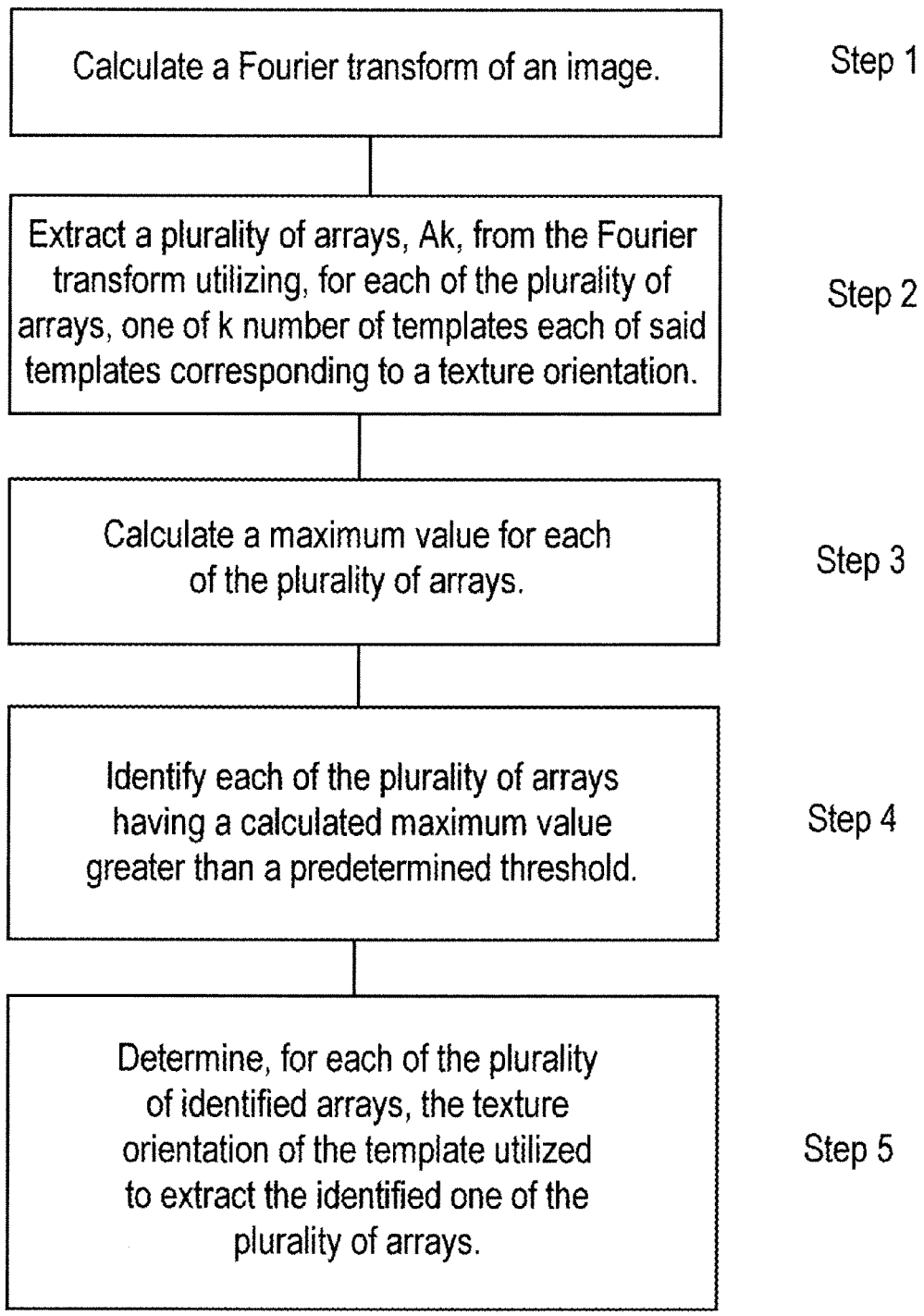
FIG. 6 is a flow chart of a method according to an exemplary and non-limiting embodiment.

With reference to FIG. 6, there is illustrated a flow diagram of an exemplary and non-limiting embodiment. In the following discussion, the following notation is used:

B—input N×N block.
F—Fourier transform of B.

In accordance with an exemplary embodiment, a method receives as input an image comprising a regular texture and returns an array MAP={$map_1, map_2, \ldots, map_Q$}:

$$map_i = \begin{cases} 1, & \text{if orientation number } i \text{ is present in texture} \\ 0, & \text{otherwise} \end{cases}$$

For example, map1 has a value of "1" if a regular texture having an orientation 10 corresponding to the orientation of the template 14 is present in input block B. In an exemplary embodiment, only half of Fourier transform F is utilized owing to the symmetric properties of the Fourier transform peaks described above.

First, at step 1, a Fourier transform F of an image B is computed. In accordance with an exemplary embodiment, there is first performed DC cancellation on a block B identified as comprising at least one periodic texture to produce B'. This procedure is used to decrease the value of DC coefficients after the Fourier transform is performed and is applied to pixel values of block B before the Fourier transform is performed. In accordance with an exemplary embodiment there is first calculated the mean value of elements in the block B:

$$mB = \frac{1}{N^2} \sum_{i=1}^{N} \sum_{j=1}^{N} B_{i,j}$$

Next, the mean value is subtracted from the block elements:

$$B'_{i,j} = B_{i,j} - mB$$

For example, for an exemplary 3×3 block:

$$B = \begin{vmatrix} 17 & 25 & 22 \\ 23 & 11 & 23 \\ 14 & 18 & 27 \end{vmatrix}$$

Mean value:

$$mB = \frac{1}{9}(17 + 25 + 22 + 23 + 11 + 23 + 14 + 18 + 27) = 20$$

Subtraction:

$$B' = \begin{vmatrix} 17-20 & 25-20 & 22-20 \\ 23-20 & 11-20 & 23-20 \\ 14-20 & 18-20 & 27-20 \end{vmatrix} = \begin{vmatrix} -3 & 5 & 2 \\ 3 & -9 & 2 \\ -6 & -2 & 7 \end{vmatrix}$$

In this example, the result of the Fourier transform output without DC offset cancellation is:

$$\begin{vmatrix} 180 & 18 & 18 \\ 6 & 24 & 8 \\ 6 & 8 & 24 \end{vmatrix}$$

With the DC offset cancellation, the Fourier transform output is:

$$\begin{vmatrix} 0 & 18 & 18 \\ 6 & 24 & 8 \\ 6 & 8 & 24 \end{vmatrix}$$

Figure 7:
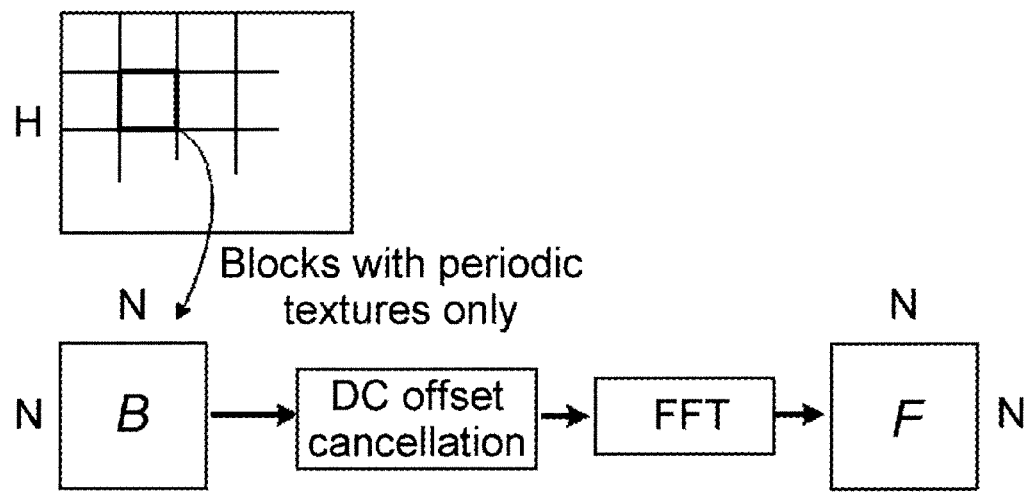
FIG. 7 is a diagram of DC offset cancellation according to an exemplary and non-limiting embodiment.

There is next calculated a Fourier transform F of block B'. In an exemplary embodiment, the size of the Fourier transform F equals the block size of block B'. An exemplary embodiment of this process is illustrated with reference to FIG. 7. With continued reference to FIG. 6, next, at step 2, Q arrays of pixels, Ak, are extracted from the position of Fourier transform F specified by the masks Tk according to equation:

$$Ak = \{F_{i,j} : F_{i,j} \times Tk_{i,j} > 0\}, k=1, 2, \ldots, Q$$

where $T^1, T^2, \ldots, T^8$—pre-defined masks consisting of ones and zeros as illustrated in FIG. 5. As described above, each mask Tk corresponds to one quantized texture orientation. Note that if one superimposes a template Tk over Fourier transform F and the line comprised of values of "1" in template Tk is coincident with a peak in Fourier transform F, the value of the peak will be multiplied by "1" and will be entered as an array element of Ak. Peaks in Fourier transform F that are not coincident with a value of "1" in template Tk are not entered into Ak.

Next, at step 3, a maximum value for each of the plurality of arrays is calculated. Specifically, maximal values for every array Ak are calculated and saved into new array M where:

$$M = \{\max(A_1), \max(A_2), \ldots, \max(A_Q)\}$$

Note that each value of array M corresponds to a relative prevalence of a peak in Fourier transform F corresponding to the orientation associated with a single template 14. Next, array M is sorted into descending order and the permutation indices of the sorted array M are saved:

$$M = \{m_1, m_2, \ldots, m_Q\}, m_1 > m_2 > \ldots > m_Q$$

$$p\text{Inds} = \{p\text{Ind}_1, p\text{Ind}_2, \ldots, p\text{Ind}_Q\}$$

where $m_1 = \max(A_{pInd1}), \ldots, m_1 = \max(A_{pIndQ})$.

An example of the preceding calculation of the permutation indices is as follows Consider an exemplary array M=[5, 10, 4, 6, 3]. When sorted in descending order Msorted=[10, 6, 5, 4, 3]. In this example, pInds=[2, 4, 1, 3, 5]. As is evident, the sorted array M, Msorted,=[M2, M4, M, M3, M5]. As is evident, the permutation indices denote the positions of elements in unsorted array M.

Next, at step 4, there is identified each of the plurality of arrays having a calculated maximum value greater than a predetermined threshold. Specifically, a value, nPeaks, is calculated representing the number of peaks in Fourier transform F:

$$nPeaks = \operatorname*{argmax}_{i}\left(\left(1 - \frac{m_i}{m_1}\right) < thr\right)$$

where thr is a pre-defined threshold.

Lastly, at step 5, for each of the plurality of arrays identified in step 4, the texture orientation of the template utilized to extract the identified one of the plurality of arrays is determined. Specifically, an output array MAP: $map_{pIndi}=1$, $pInd_i \in \{1, 2, \ldots, nPeaks\}$ is formed. Note that array MAP is comprised of zero values and a number of "1" values where the number of "1" values is equal to the number of detected peaks. Further, as each element in array MAP corresponds to a template 14 and a corresponding orientation, it is possible to select any or all of the elements of array MAP having a value of "1" to determine one or more of the orientations of regular textures present in B.

Figure 8:
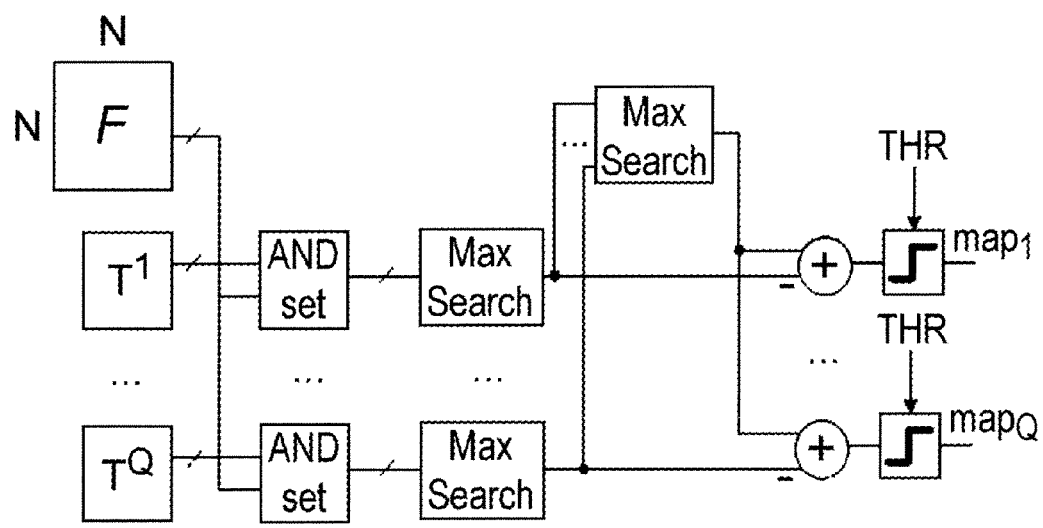
FIG. 8 is schematic logic diagram of a method according to an exemplary and non-limiting embodiment.
Figures 9A, 9B, 9C, 9D:
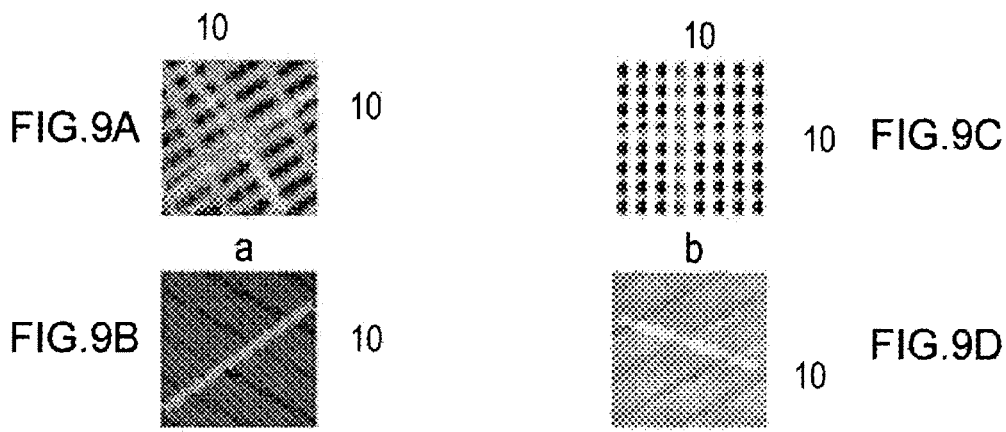
FIGS. 9A-9D are illustrations of exemplary regular textures and corresponding computed texture orientations according to an exemplary and non-limiting embodiment.

With reference to FIG. 8, there is illustrated a schematic logic diagram of step 2 through step 5 described above. With reference to FIGS. 9A-9D, there are illustrated four exemplary regular textures with the computed orientations 10 superimposed upon the regular textures.

As is evident from the discussion above, the use of templates as described allows for the implementation a low complexity scheme for deriving texture orientations in images. With reference to FIG. 8, each Fourier transform F is parallel processed by a set of templates. Processing includes selecting the elements from the Fourier transform F on non-zero positions of template. Then the maximal value is found in the output of every template (local maximum) and among all the elements (global maximum). For those templates for which the difference between local maximum and global maximum is lower than some pre-defined threshold thr the output is 1. Otherwise the output is 0.

Figure 10:
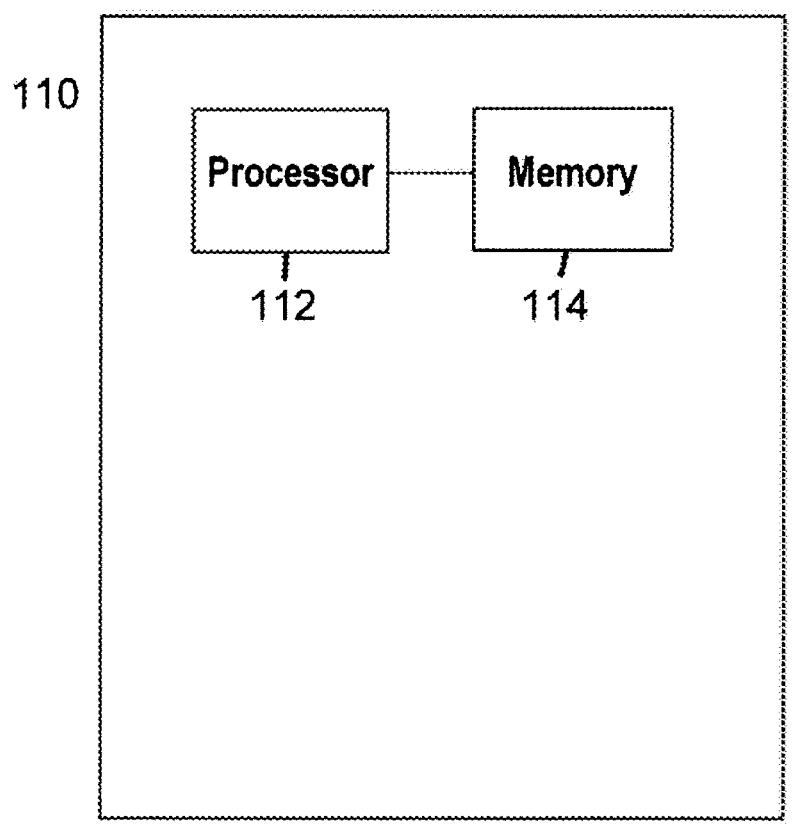
FIG. 10 is a diagram of a device according to an exemplary and non-limiting embodiment.

With reference to FIG. 10, there is illustrated a device 110 for performing the various exemplary embodiments described herein. The device 110 includes a processor 112 according to any of the embodiments described herein. For example, the processor 112 might be comprised of a host processor, a co-processor, and/or a memory unit for storing instructions and/or data required to perform any of the functions described above. In addition to an internal memory, the processor 112 may additionally be in communication with the memory 114 comprised of, for example, RAM memory for storing instruction and/or data.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Figure 11:
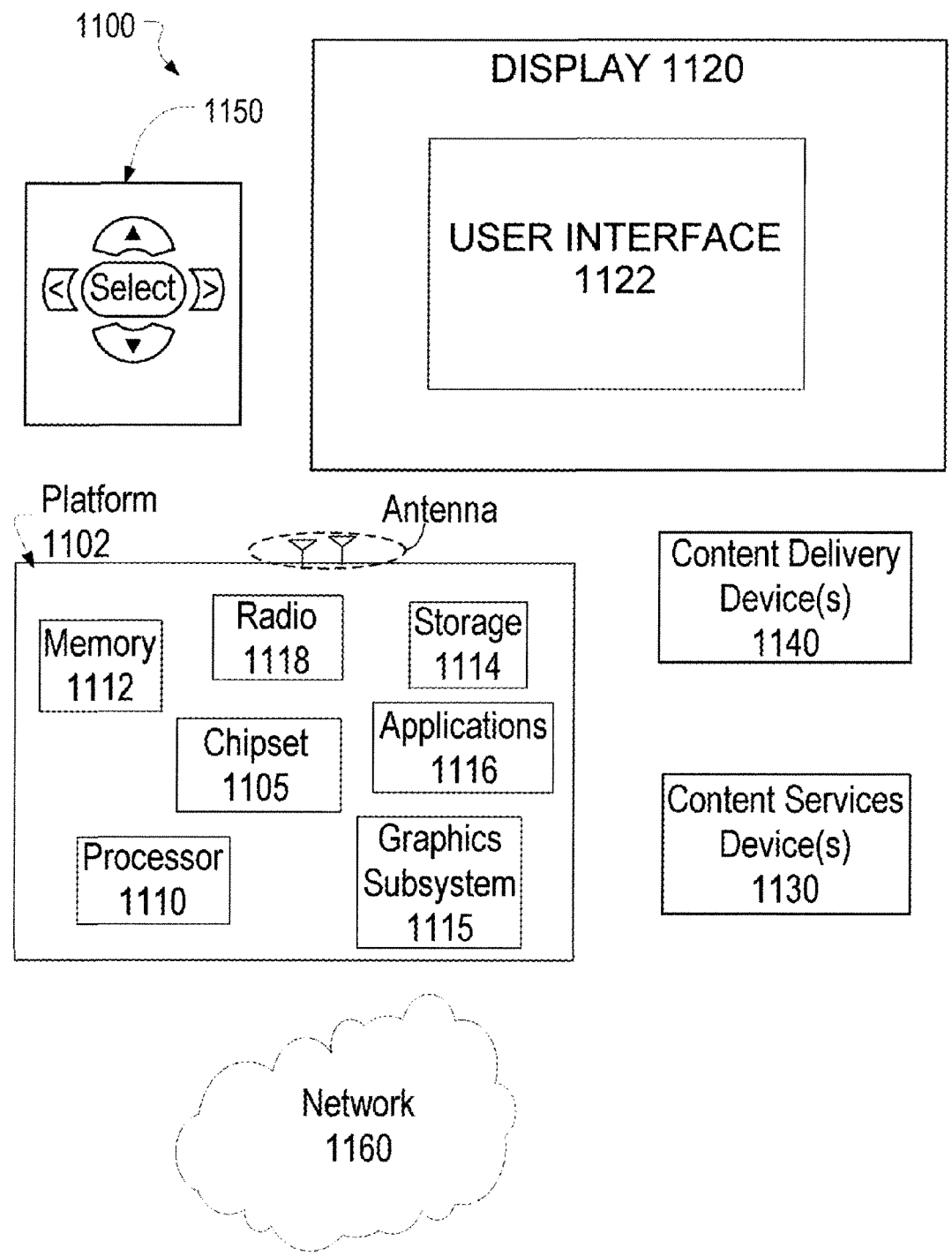
FIG. 11 illustrates another system in accordance with some embodiments.

FIG. 11 illustrates an embodiment of a system 1100. In embodiments, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1100 comprises a platform 1102 coupled to a display 1120. Platform 1102 may receive content from a content device such as content services device(s) 1130 or content delivery device(s) 1140 or other similar content sources. A navigation controller 1150 comprising one or more navigation features may be used to interact with, for example, platform 1102 and/or display 1120. Each of these components is described in more detail below.

In embodiments, platform 1102 may comprise any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 1110 may comprise dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1114 may comprise technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 could be integrated into processor 1110 or chipset 1105. Graphics subsystem 1115 could be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 1118 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In embodiments, display 1120 may comprise any television type monitor or display. Display 1120 may comprise, for example, a computer display screen, touch screen display, video monitor, television-like device, and/or a television. Display 1120 may be digital and/or analog. In embodiments, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In embodiments, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In embodiments, content services device(s) 1130 may comprise a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 receives content such as cable television programming including media information, digital information, and/or other content. Examples of content providers may include any cable or satellite television or radio or Internet content providers. The provided examples are not meant to limit embodiments of the invention.

In embodiments, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be echoed on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but integrated into platform 1102 and/or display 1120. Embodiments, however, are not limited to the elements or in the context shown or described herein.

In embodiments, drivers (not shown) may comprise technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 when the platform is turned "off" In addition, chip set 1105 may comprise hardware and/or software support for 5.1 surround sound audio and/or high definition 11.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the invention.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
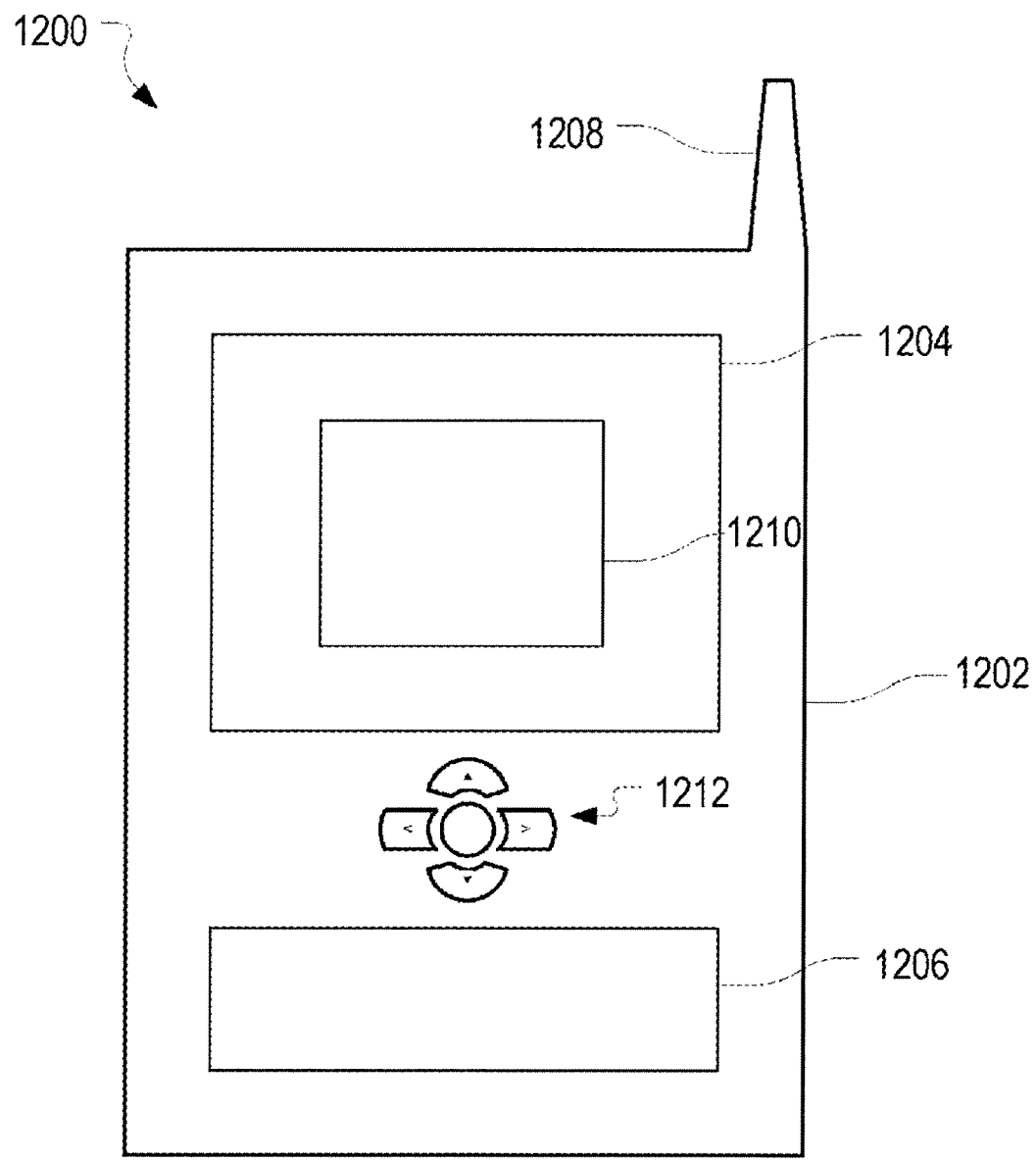
FIG. 12 is an example of a small form factor device in accordance with some embodiments.

As described above, system 1100 may be embodied in varying physical styles or form factors. FIG. 12 illustrates embodiments of a small form factor device 1200 in which system 1100 may be embodied. In embodiments, for example, device 1200 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may comprise a housing 1202, a display 1204, an input/output (I/O) device 1206, and an antenna 1208. Device 1200 also may comprise navigation features 1212. Display 1204 may comprise any suitable display unit for displaying information appropriate for a mobile computing device. I/O device 1206 may comprise any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various modifications and changes may be made to the foregoing embodiments without departing from the broader spirit and scope set forth in the appended claims. The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of video files, note that embodiments may be associated with other types of information. For example, a digital book or audio file might be associated with a chop file. Moreover, while embodiments have been illustrated using particular ways of selecting a level of detail, note that embodiments might be associated with other ways of determining detail levels (e.g., by automatically detecting that a person is not paying attention to the current level of detail).

Embodiments have been described herein solely for the purpose of illustration. Persons skilled in the art will recognize from this description that embodiments are not limited to those described, but may be practiced with modifications and alterations limited only by the spirit and scope of the appended claims.

The invention claimed is:

1. A method comprising:
    calculating a Fourier transform of an image comprising at least one regular texture, wherein a regular texture is comprised of a repeating or periodic pattern having different orientations;
    extracting a plurality of arrays, from the Fourier transform utilizing, for each of the plurality of arrays, one of a plurality of templates each of said templates corresponding to a texture orientation;
    calculating a maximum value for each of the plurality of arrays;
    identifying each of the plurality of arrays having a calculated maximum value greater than a predetermined threshold; and
    automatically determining, for each of the plurality of identified arrays, the texture orientation of the template utilized to extract the identified one of the plurality of arrays.

2. The method of claim 1 further comprising performing a DC offset cancellation to the image prior to calculating the Fourier transform.

3. The method of claim 1 further comprising selecting the image such that the image comprises at least one regular texture.

4. The method of claim 1 wherein the Fourier transform is the same size as each of the plurality of templates.

5. The method of claim 4 wherein each of the plurality of templates comprises one or more elements having a value of one (1) each such value corresponding, generally, to a line extending from a center of the template to a periphery of the template at an angle corresponding to the texture orientation of the template.

6. The method of claim 5 wherein the center of each of the plurality of templates corresponds to an origin of the Fourier transform.

7. The method of claim 6 wherein the origin of the Fourier transform corresponds to a DC component.

8. The method of claim 5 wherein each of one or more elements of each of the plurality of templates not having a value of one (1) have a value of zero.

9. The method of claim 1 wherein identifying each of the plurality of arrays having a calculated maximum value comprises creating an array of the calculated maximum values of the plurality of arrays and sorting the elements of the array of the calculated maximum values by magnitude.

10. The method of claim 1 wherein each of the plurality of templates corresponds to one of a set of quantized texture orientation angles.

11. A non-tangible computer readable medium having stored thereon instructions which, when executed by a processor, cause the processor to:
    calculate a Fourier transform of an image comprising at least one regular texture, wherein a regular texture is comprised of a repeating or periodic pattern having different orientations;
    extract a plurality of arrays, from the Fourier transform utilizing, for each of the plurality of arrays, one of a plurality of templates each of said templates corresponding to a texture orientation;
    calculate a maximum value for each of the plurality of arrays;
    identify each of the plurality of arrays having a calculated maximum value greater than a predetermined threshold; and
    determine, for each of the plurality of identified arrays, the texture orientation of the template utilized to extract the identified one of the plurality of arrays.

12. The medium of claim 11 wherein the processor is further instructed to perform a DC offset cancellation to the image prior to calculating the Fourier transform.

13. The medium of claim 11 wherein the processor is further instructed to select the image such that the image comprises at least one regular texture.

14. The medium of claim 11 wherein the Fourier transform is the same size as each of the plurality of templates.

15. The medium of claim 14 wherein each of the plurality of templates comprises one or more elements having a value of one (1) each such value corresponding, generally, to a line extending from a center of the template to a periphery of the template at an angle corresponding to the texture orientation of the template.

16. The medium of claim 15 wherein the center of each of the plurality of templates corresponds to an origin of the Fourier transform.

17. The medium of claim 16 wherein the origin of the Fourier transform corresponds to a DC component.

18. The medium of claim 15 wherein each of one or more elements of each of the plurality of templates not having a value of one (1) have a value of zero.

19. The medium of claim 11 wherein identifying each of the plurality of arrays having a calculated maximum value comprises creating an array of the calculated maximum values of the plurality of arrays and sorting the elements of the array of the calculated maximum values by magnitude.

20. The medium of claim 11 wherein each of the plurality of templates corresponds to one of a set of quantized texture orientation angles.

21. A system, comprising:
    a display screen; and
    a display device, coupled to the display screen, to: (i) calculate a Fourier transform of an image comprising at least one regular texture, wherein a regular texture is comprised of a repeating or periodic pattern having different orientations, (ii) extract a plurality of arrays, from the Fourier transform utilizing, for each of the plurality of arrays, one of a plurality of templates each of said templates corresponding to a texture orientation, (iii) calculate a maximum value for each of the plurality of arrays, (iv) identify each of the plurality of arrays having a calculated maximum value greater than a predetermined threshold, and (v) automatically determine, for each of the plurality of identified arrays, the texture orientation of the template utilized to extract the identified one of the plurality of arrays.

22. The system of claim 21 wherein the display device is further to perform a DC offset cancellation to the image prior to calculating the Fourier transform.

23. The system of claim 21 wherein the display device is further to select the image such that the image comprises at least one regular texture.

24. A method comprising:
calculating a Fourier transform of an image;
extracting a plurality of arrays, from the Fourier transform utilizing, for each of the plurality of arrays, one of a plurality of templates each of said templates corresponding to a texture orientation;
calculating a maximum value for each of the plurality of arrays;
identifying each of the plurality of arrays having a calculated maximum value greater than a predetermined threshold; and
automatically determining, for each of the plurality of identified arrays, the texture orientation of the template utilized to extract the identified one of the plurality of arrays;
wherein the Fourier transform is the same size as each of the plurality of templates; and
wherein each of the plurality of templates comprises one or more elements having a value of one (1) each such value corresponding, generally, to a line extending from a center of the template to a periphery of the template at an angle corresponding to the texture orientation of the template.

25. A non-tangible computer readable medium having stored thereon instructions which, when executed by a processor, cause the processor to:
calculate a Fourier transform of an image;
extract a plurality of arrays, from the Fourier transform utilizing, for each of the plurality of arrays, one of a plurality of templates each of said templates corresponding to a texture orientation;
calculate a maximum value for each of the plurality of arrays;
identify each of the plurality of arrays having a calculated maximum value greater than a predetermined threshold; and
determine, for each of the plurality of identified arrays, the texture orientation of the template utilized to extract the identified one of the plurality of arrays;
wherein the Fourier transform is the same size as each of the plurality of templates; and
wherein each of the plurality of templates comprises one or more elements having a value of one (1) each such value corresponding, generally, to a line extending from a center of the template to a periphery of the template at an angle corresponding to the texture orientation of the template.

26. A method comprising:
calculating a Fourier transform of an image;
extracting a plurality of arrays, from the Fourier transform utilizing, for each of the plurality of arrays, one of a plurality of templates each of said templates corresponding to a texture orientation;
calculating a maximum value for each of the plurality of arrays;
identifying each of the plurality of arrays having a calculated maximum value greater than a predetermined threshold, wherein the identification comprises creating an array of the calculated maximum values of the plurality of arrays and sorting the elements of the array of the calculated maximum values by magnitude; and
automatically determining, for each of the plurality of identified arrays, the texture orientation of the template utilized to extract the identified one of the plurality of arrays.

27. A non-tangible computer readable medium having stored thereon instructions which, when executed by a processor, cause the processor to:
calculate a Fourier transform of an image;
extract a plurality of arrays, from the Fourier transform utilizing, for each of the plurality of arrays, one of a plurality of templates each of said templates corresponding to a texture orientation;
calculate a maximum value for each of the plurality of arrays;
identify each of the plurality of arrays having a calculated maximum value greater than a predetermined threshold, wherein the identification comprises creating an array of the calculated maximum values of the plurality of arrays and sorting the elements of the array of the calculated maximum values by magnitude; and
determine, for each of the plurality of identified arrays, the texture orientation of the template utilized to extract the identified one of the plurality of arrays.

\* \* \* \* \*